US010145525B2

(12) United States Patent
Shannin et al.

(10) Patent No.: US 10,145,525 B2
(45) Date of Patent: Dec. 4, 2018

(54) PHOTO-VOLTAIC POWERED WIRELESS SENSOR FOR PASSIVE OPTICAL LIGHTING

(71) Applicant: ABL IP Holding LLC, Conyers, GA (US)

(72) Inventors: Peter Shannin, Decatur, GA (US); Audwin Cash, Brookhaven, GA (US)

(73) Assignee: ABL IP HOLDING LLC, Conyers, GA (US)

( * ) Notice: Subject to any disclaimer, the term of this patent is extended or adjusted under 35 U.S.C. 154(b) by 0 days.

(21) Appl. No.: 15/297,674

(22) Filed: Oct. 19, 2016

(65) Prior Publication Data

US 2018/0106443 A1  Apr. 19, 2018

(51) Int. Cl.
| | | |
|---|---|---|
| *F21S 19/00* | (2006.01) | |
| *H05B 37/02* | (2006.01) | |
| *H05B 33/08* | (2006.01) | |
| *F21S 11/00* | (2006.01) | |
| *F21V 14/08* | (2006.01) | |
| *F21V 14/00* | (2018.01) | |

(52) U.S. Cl.
CPC .......... *F21S 19/005* (2013.01); *F21S 11/002* (2013.01); *F21V 14/003* (2013.01); *F21V 14/08* (2013.01); *H05B 33/0854* (2013.01); *H05B 37/0218* (2013.01); *H05B 37/0272* (2013.01)

(58) Field of Classification Search
CPC ..... F21S 19/005; F21S 11/007; F21V 14/003; H05B 33/0854; H05B 37/0218
See application file for complete search history.

(56) References Cited

U.S. PATENT DOCUMENTS

| | | | |
|---|---|---|---|
| 4,236,101 A | 11/1980 | Luchaco | |
| 8,723,447 B2 | 5/2014 | Steiner | |
| 8,731,689 B2 | 5/2014 | Platner | |
| 8,793,944 B2 | 8/2014 | Blomberg | |
| 8,866,391 B2 | 10/2014 | Ganick | |
| 9,001,317 B2 | 4/2015 | Ramer | |
| 9,287,976 B2 | 3/2016 | Ganick | |
| 2011/0309753 A1* | 12/2011 | Cash | H05B 37/0218 315/149 |
| 2012/0155889 A1* | 6/2012 | Kim | H04B 10/116 398/193 |

(Continued)

FOREIGN PATENT DOCUMENTS

KR   20140132025 A  * 11/2014

*Primary Examiner* — Douglas W Owens
*Assistant Examiner* — Pedro C Fernandez
(74) *Attorney, Agent, or Firm* — RatnerPrestia

(57) ABSTRACT

A daylighting device includes a photo-voltaic (PV) device that is mounted in or proximate to the daylighting device that provides sunlight to a service area. The PV device generates a power signal from incident sunlight. The power signal provides operational power to circuitry associated with the daylighting device, such as a transmitter that transmits a value representing the intensity of light on or near the daylighting device. This signal, which is generated either from the power signal or from a signal provided by a photosensor mounted in or proximate to the daylighting device, may be used by a control system to adjust light levels provided by artificial light sources to supplement the sunlight provided by the daylighting device to approach the desired light level in the service area.

18 Claims, 11 Drawing Sheets

(56) References Cited

U.S. PATENT DOCUMENTS

| | | | |
|---|---|---|---|
| 2013/0314795 A1* | 11/2013 | Weaver | G02B 19/0042 |
| | | | 359/591 |
| 2014/0117877 A1* | 5/2014 | Mapel | H05B 33/086 |
| | | | 315/294 |
| 2014/0175985 A1 | 6/2014 | Billig | |
| 2015/0043425 A1 | 2/2015 | Aggarwal | |
| 2015/0147067 A1 | 5/2015 | Ryan | |
| 2015/0245444 A9 | 8/2015 | Delnoij | |
| 2016/0040841 A1* | 2/2016 | Martzall | F21V 23/04 |
| | | | 362/183 |
| 2016/0245688 A1* | 8/2016 | Verbeek | G01J 1/06 |

* cited by examiner

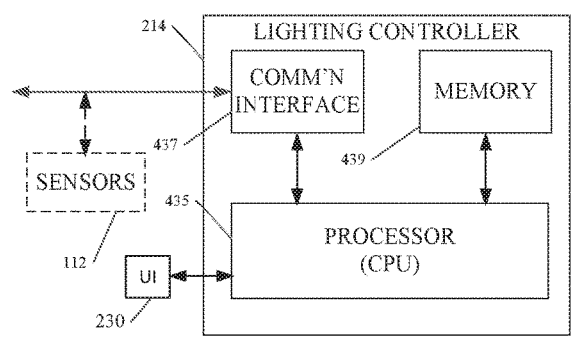
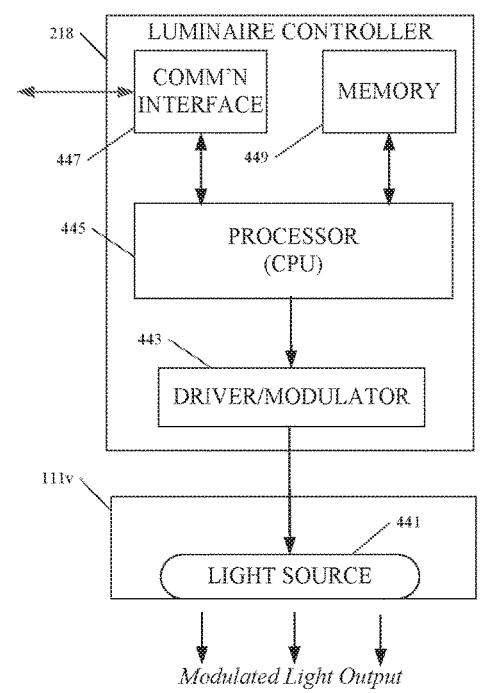
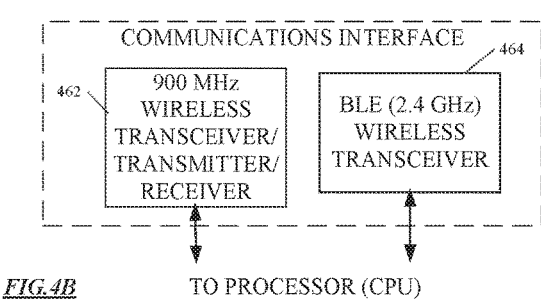

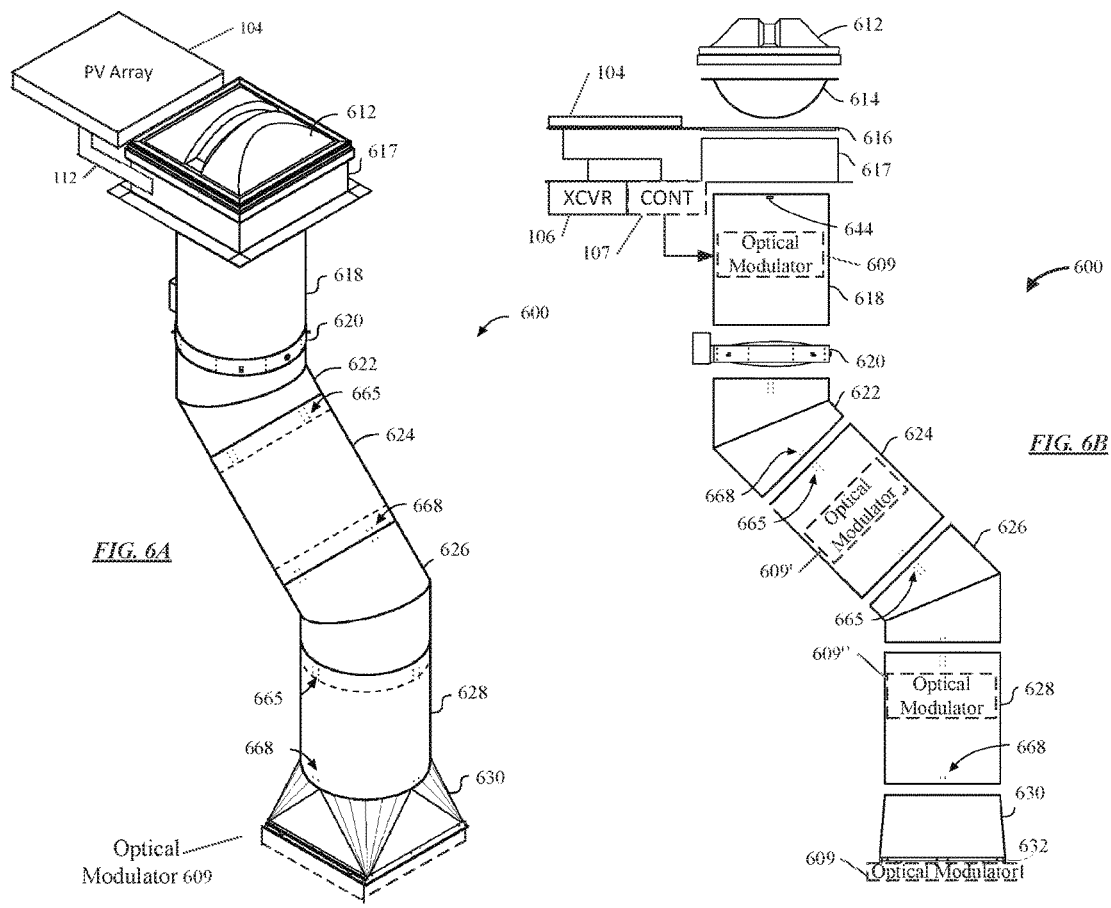

PHOTO-VOLTAIC POWERED WIRELESS SENSOR FOR PASSIVE OPTICAL LIGHTING

TECHNICAL FIELD

The present subject matter relates to passive optical lighting, e.g. as supplied to an interior space via a daylighting device such as a skylight, window or the like and in particular to a daylighting device coupled to a photo-voltaic (PV) device that powers a light sensor and transceiver.

BACKGROUND

Almost all interior spaces include artificial lighting to ensure proper light levels for a work environment and/or desirable light levels in a home environment. Traditionally, artificial lights are manually turned on or off from a wall switch to control lighting levels. In some cases, lighting devices may be dimmed, usually in response to user activation of a relatively simple wall-mounted dimmer. Lighting devices have also been controlled in response to ambient light detectors that turn on a light only when ambient light is at or below a threshold (e.g. as the sun goes down) and in response to occupancy sensors (e.g. to turn on light when a room is occupied and to turn the light off when the room is no longer occupied for some period). Often traditional lighting devices are controlled individually or as relatively small groups at separate locations.

With the advent of modern electronics has come advancements, including advances in the types of light sources as well as advancements in networking and control capabilities of the lighting devices. For example, solid state sources have become a commercially viable alternative to traditional light sources such as incandescent and fluorescent lamps. By nature, solid state light sources such as light emitting diodes (LEDs) are easily controlled by electronic logic circuits or processors. Electronic controls have also been developed for other types of light sources. As increased processing capacity finds its way into the lighting devices, it becomes relatively easy to incorporate associated communications capabilities, e.g. to allow lighting devices to communicate with system control elements and/or with each other. In this way, advanced electronics in the lighting devices as well as the associated control elements have facilitated more sophisticated lighting control algorithms as well as increased networking of lighting devices.

In view of the power and environmental concerns, many installations do not rely solely on artificial lighting during daytime hours of operations. Daylighting is a practice of placing or constructing elements of a building to distribute daylight from outside the building into interior space(s) of the building, which may reduce the need for artificial lighting during daytime hours. Traditional examples of daylighting devices involved appropriate sizing and placement of windows in walls or doors of the building or of skylights or the like in roofs/ceilings of the building. More sophisticated daylighting equipment utilizes optical collectors, channels, reflectors and optical distributors to supply and distribute light from outside the building to regions of the interior space. Although various daylighting systems may, be adjustable, they typically are passive in nature. The light supplied to the interior region of the building is redirected (and/or produced in response to) sunlight from the exterior region of the building. Artificial lighting may be combined with daylighting equipment, either in the form of luminaires in the vicinity of a daylighting device or by incorporation of an artificial light source within the same structure that implements the daylighting device. The addition of artificial lighting to a daylighting system provides additional light to the interior region, e.g. in regions where the daylighting may not be adequate and/or for days or times when the collected sunlight may not be sufficient.

Some environments that maintain a relatively uniform lighting level using both daylighting devices and artificial lighting employ closed-loop control systems a that uses monitoring device to sense the light level in the room and a controller that control either or both of the artificial lighting or a light modulator coupled to the daylighting device. These systems increase or decrease the light levels of the artificial and/or daylighting light sources in response to changing levels of sensed light. It is difficult to determine the proper location for the sensors used by these systems as the sensor placement at one location may result in undesirable lighting at a different location.

BRIEF DESCRIPTION OF THE DRAWINGS

The drawing figures depict one or more implementations in accord with the present concepts, by way of example only, not by way of limitations. In the figures, like reference numerals refer to the same or similar elements.

FIGS. 4A, 4C and 4D are block diagrams of example controllers for the system shown in FIG. 2B.

FIG. 4B is a block diagram of a communications interface;

FIGS. 6A and 6B are side and exploded views of a tubular prismatic skylight.

DETAILED DESCRIPTION

Figure 1A:
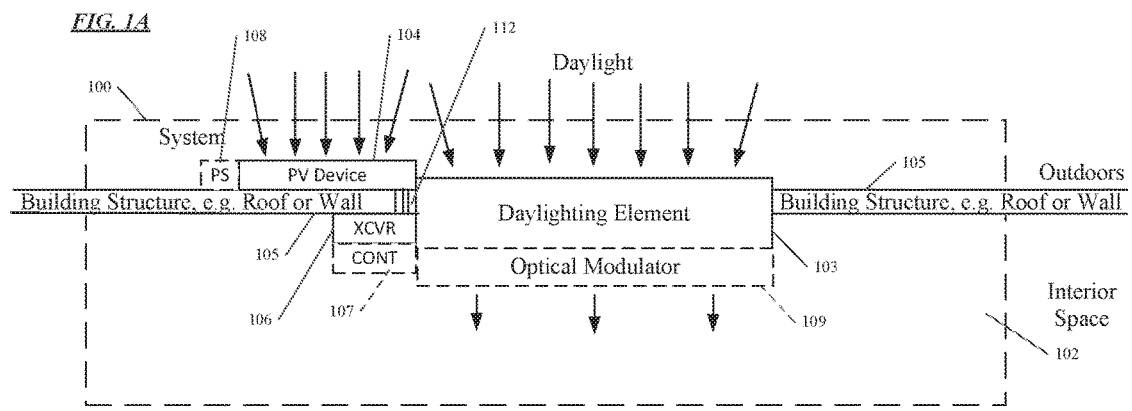
FIGS. 1A, 1B, and 1C are side-plan views of several examples, each example including a wall or roof of a structure, a daylighting device, a PV device and a transmitter.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The various examples disclosed herein relate to techniques and equipment to control artificial lighting and passive optical lighting, e.g. as supplied from an exterior region to an interior region via a daylighting device such as a skylight, window or the like.

As described above, it is difficult to determine the proper location for the sensors used by daylighting systems to maintain ambient light levels by controlling daylighting devices and the artificial light sources. Furthermore, powered sensors either use batteries, that need to be replaced, or connections to the electrical wiring in the interior region, that require extra work during installation. These difficulties may be overcome by using a PV powered daylighting device that transmits sensed light intensity values to a remote location. A controller at the remote location controls artificial light sources and, optionally, daylighting sources in an open loop system to adjust illumination intensity in a service area. The PV powered device does not connect to the building wiring and, so, is relatively simple to install.

The term "lighting device" as used herein is intended to encompass essentially any type of device that processes generates or supplies light, for example, for general illumination of a space intended for use of or occupancy or observation, typically by a living organism that can take advantage of or be affected in some desired manner by the light emitted from the device. However, a lighting device may provide light for use by automated equipment, such as sensors/monitors, robots, etc. that may occupy or observe the illuminated space, instead of or in addition to light provided for an organism. However, it is also possible that one or more lighting devices in or on a particular premises have other lighting purposes, such as signage for an entrance or to indicate an exit. Of course, the lighting devices may be configured for still other purposes, e.g. to benefit occupants of the space (e.g. human or non-human organisms, robots, cyborgs, etc.) or to repel or even impair other occupants (e.g. human or non-human organisms, robots, cyborgs, etc.). In most examples, the lighting device(s) illuminate a space or area of a premises to a level useful for a human in or passing through the space, e.g. regular illumination of a room or corridor in a building or of an outdoor space such as a street, sidewalk, parking lot or performance venue. The actual source of light in or supplying the light for a lighting device may be any type of light emitting, collecting or directing arrangement. The term "lighting device" encompasses passive lighting devices that collect and supply natural light as well as artificial lighting devices, such as luminaires, which include a light source that generates light.

The term "daylighting device" as used herein is intended to encompass essentially any type of passive optical lighting that supplies daylight, that the device obtains outside a structure, to the interior of the structure, e.g. to provide desired illumination of the interior region within the structure with otherwise natural light. A daylighting device may be combined with other elements that consume electrical power for other purposes, such as communications, data processing and/or modulation of otherwise passive lighting. For example, a modulated daylighting device is a lighting device having a passive optical element and an associated optical modulator to modulate light supplied in some manner via the passive optical element, albeit without any consumption of power to generate the light to be supplied for illumination purposes (although power may be consumed to modulate passively obtained light).

The term "artificial lighting" as used herein is intended to encompass essentially any type of lighting that a device produces light by processing of electrical power to generate the light. An artificial lighting device, for example, may take the form of a lamp, light fixture or other luminaire that incorporates a source, where the source by itself contains no intelligence or communication capability, such as one or more LEDs or the like, or a lamp (e.g. "regular light bulbs") of any suitable type.

The term "coupled" as used herein refers to any logical, physical or electrical connection, link or the like by which signals, data, instructions or the like produced by one system element are imparted to another "coupled" element. Unless described otherwise, coupled elements or devices are not necessarily directly connected to one another and may be separated by intermediate components, elements or communication media that may modify, manipulate or carry the signals.

Figure 1B:
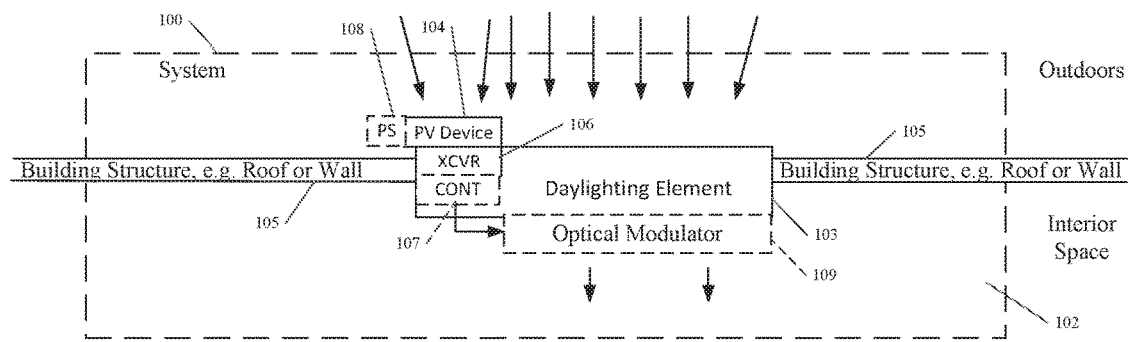
Figure 1C:
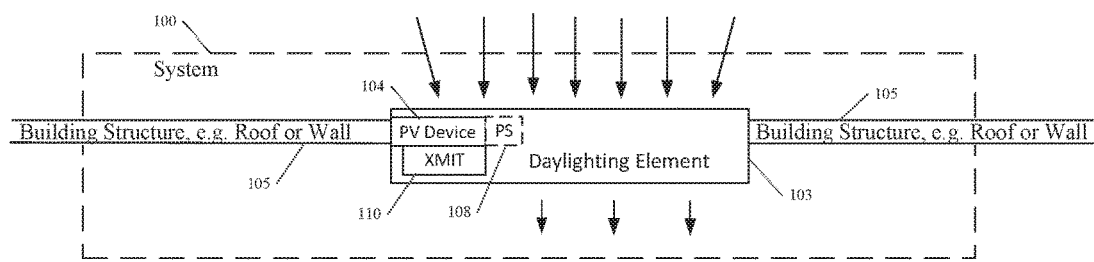

Reference now is made in detail to the examples illustrated in the accompanying drawings and discussed below. FIGS. 1A through 1C illustrate example PV powered daylighting devices 100. The device shown in FIG. 1A includes a daylighting device 103 such as a skylight or window, a photovoltaic (PV) device 104 such as an array of photovoltaic cells (PV array), and a daylighting transceiver 106.

The example daylighting element 103 is at least substantially transmissive with respect to daylight. For example, the daylighting element 103 is configured to receive daylight from outside a structure 105 and allow passage of light from an exterior region to an interior region of the structure. The example shows the daylighting element 103 mounted in an exterior building structure 105, such as a roof or wall. Although there will be some losses as the light passes through the element 103 from the exterior region or a service area in the interior region, the transmissivity of the element 103 is sufficient to provide useful illumination in the interior region, at least at times of bright daylight outdoors. The daylighting element 103, for example, may be a transparent or translucent glass, acrylic or plastic member in the form or part of a window, a sun-room roof, or a skylight (or part of the skylight). The daylighting element 103 may also include one or more diffusers (not shown) to spread the sunlight over a wider area. The orientation shown in FIG. 1A, might correspond to a roof mounted skylight or the roof of a sun-room or the like; it is contemplated that other orientations may be used for windows or the like. Although not shown in the simple illustration of the example, passive optical element 103 may be a transmissive section or component of a more sophisticated daylighting device such as a tubular prismatic skylight, that includes an optical collector, a channel, one or more reflectors and an optical distributor to supply and distribute natural light from outside the building to regions of the interior region.

Optionally, the device 100 shown in FIG. 1A may include a photosensor 108, an optical modulator 109 and a daylighting controller 107. The example PV device 104 shown in FIG. 1 is mounted on the exterior of the building structure 105 and power from the PV device 104 is fed through the building structure, as shown by the connector 112, to power the daylighting transceiver 106. In this example, the transceiver 106 receives operational power from the PV device 104. In this example, the daylighting transceiver 106 includes circuitry that determines the present light intensity on the daylighting device from the power signal provided by the PV device. The intensity of the light on the PV device is desirably substantially the same (e.g. within ±10 percent) of the intensity of the light on the daylighting element 103. The transceiver transmits this lighting intensity information along with information identifying the particular daylighting device, to a remote controller (not shown). In this implementation, the transceiver is periodically polled by the remote controller to provide the most recent intensity measurement. It is contemplated, however, that the device shown in FIG. 1A may provide measurements asynchronously, in which case, the daylighting transceiver 106 may be replaced by a daylighting transmitter.

FIG. 1B shows an alternative PV powered daylighting device 100 that differs from FIG. 1A in that the PV device 104 and optional photosensor 108 are integral with the daylighting element 103. Again, it is desirable for the light intensity on the photosensor 108 to be substantially the same as the light intensity on the daylighting element 103. This construction simplifies installation as there is no need to route wiring from the PV device 104 through the building structure 105. Instead, the wiring is routed through the daylighting element 103. The example device 100 has the PV device 104 mounted on the exterior of the daylighting element 103 for maximum solar exposure. The daylighting transceiver 106, optional daylighting controller 107 and optional optical modulator 109 are mounted internal to the daylighting element 103.

FIG. 1C shows another alternative PV powered daylighting device 100 in which the PV device 104, optional photosensor 108 and daylighting transmitter 110 are integrated into the daylighting device 103 and are protected from the elements by the enclosure of the daylighting device. The power produced by the PV device 104 may be reduced relative to the PV devices 104 shown in FIGS. 1A and 1B due to optical attenuation of light passing through the enclosure. This example may have advantages, however as the device is one self-contained unit and, thus, may be easier to install.

Because the devices shown in FIGS. 1A, 1B and 1C are powered by their respective PV devices, they would not need any connection the building wiring. They may, however, need a ground connection. This can be provided by a connection to metallic structural elements of the building, such as joists.

The example daylighting transceiver 106 used in the PV powered daylighting devices 100 shown in FIGS. 1A and 1B and the daylighting transmitter 110 of the device 100 shown in FIG. 1C may operate according to any of a number of different short-range electromagnetic transmission and reception protocols such as Bluetooth® (including Bluetooth Low Energy or BLE), Zigbee (IEEE 802.15.4), WiFi (IEEE 802.11) and/or Near Field Communication (NFC). The daylighting transceiver 106 may also use an optical transmission device that operates according to a VLC protocol or other optical transmission protocol. Such an optical transmission device may operate at visible, infrared and/or ultraviolet wavelengths. Alternatively, the transmission device may be an ultrasonic device. As described below, the PV powered daylighting device 100 may include an optical modulator 109 that selectively attenuates daylight provided to the service area and/or that implements a VLC protocol. It is contemplated that this VLC modulator may be used in place of the transmitter portion of the daylighting transceiver 106 or as the daylighting transmitter 110 shown in FIG. 1C. When the optical modulator 109 is used as the transmitter, the device 100 may include a separate radio-frequency, magnetic, optical or ultrasonic receiver (not shown) to implement a daylighting receiver functionality of the daylighting transceiver device. As described below with reference to FIG. 4D, the daylighting transceiver 106 may include multiple transceivers, for example a first transceiver that is used for lighting control and a second transceiver that is used for commissioning. It is contemplated that these devices may employ separate daylighting transmitters and receivers rather than transceivers.

Rather than using the power signal provided by the PV device 104 to determine light intensity, the devices in FIGS. 1A, 1B and 1C may use the optional photosensor 108. Details on the circuitry used to detect and transmit the light intensity levels is described in more detail below with reference to FIGS. 3A and 3B.

The PV device 104 may include an array of solar cells, these cells may include one or more of monocrystalline silicon, polycrystalline silicon, amorphous silicon, perovskite, cadmium telluride, and/or copper indium gallium selenide/sulfide photo-electric devices. In addition, each solar cell or the entire array of solar cells may include an optical concentrator that focuses light onto the solar cells. In example systems, the solar cells are coupled in series to generate desired voltage levels and groups of the series-connected cells are coupled in parallel to generate desired current levels for a range of light intensities. As described below, the PV device may be configured to charge an energy storage device, such as a battery or ultracapacitor, which provides operational power to the daylighting transmitter 110 or daylighting transceiver 106, which includes the daylighting transmitter and a daylighting receiver, as well as to the optional daylighting controller 107 and optical modulator 109. Alternatively, the PV powered daylighting device may not include an energy storage device and the PV device 104 may provide power to these devices directly. In this implementation, transmissions from the device 100 would occur only when the solar intensity is sufficient to generate the power used by the electronic devices associated with the particular PV powered daylighting device. Although the PV device 104 is described as a PV array, it is contemplated that a single PV solar cell having sufficient power could be used.

In addition, the PV devices 104 may include a solar tracking device (not shown), such as a clock motor or a servo motor having a control loop that maximizes the energy output of the solar array. The example solar tracking device causes the array 104 to change its orientation so that the solar cells are always pointed toward the sun. Such a solar tracking device may, for example, cause the array to move to an east-facing direction at or just before sunset to ensure that the device 104 is properly oriented at sunrise and to adjust the north-south angle of the PV device 104 seasonally to track the sun. The when a solar tracking device is used, it may receive operational power from the solar cell array or from a battery or ultracapacitor (not shown in FIG. 1A) that is charged by the PV device 104.

The PV powered daylighting device 100 may use the optional optical modulator 109 and controller daylighting 107 either as a shading device to attenuate or block light from the daylighting device 103 during periods of strong daylight, or to actively modulate the light passing through the daylighting device 103 to implement a visible light communication (VLC) protocol. An example VLC protocol is described in U.S. Pat. No. 8,866,391 entitled SELF-IDENTIFYING MODULATED LIGHT SOURCE, which is incorporated by reference for its teaching on visible light communications.

The example optional optical modulator 109 is associated with the daylighting element 103 so as to modulate light passively supplied from the exterior region through the optical element 103 for modulated emission into the interior region of the structure. In the example, the modulator 109 is positioned so as to modulate light that the modulator 109 receives from the daylighting element 103; however, that arrangement is shown by way of example only. As another example, the optional optical modulator 109 may be located to modulate light before entry into the daylighting element 103. Stated another way, the optical modulator 109 may be adjacent to or mounted on the entry or exit surface(s) or both surfaces of the daylighting element 103. As another type of example, the optical modulator 109 may be integrated into the structure of the daylighting element 103.

The optional modulator 109 is optical in that it modulates optical light energy. In the examples, the optical modulator 109 is configured to optically modulate light wavelengths in a range encompassing at least a substantial portion of the visible light spectrum. For example, some types of modulators may modulate ultraviolet light as well as some visible light in a range including near-ultraviolet in the visible spectrum and possibly some visible blue light. Other types of modulators may modulate just specific ranges within the visible spectrum, e.g. ranges of red, green or blue light. Still other optical modulator configurations may modulate 80% or more of the visible spectrum and/or may modulate the entire visible spectrum as well as some light in the infrared or ultraviolet ranges of the spectrum.

By way of a first example, a general category of optical modulator technology is switchable glass—sometimes referred to as smart glass. Switchable glass typically is implemented as a multi-layered structure of transparent and switchable materials. For example, a switchable layer may be sandwiched between two transparent layers of glass, plastic or the like. One state of the switchable material exhibits relatively high transmissivity (e.g. is transparent or brightly translucent); whereas, in another state, the switchable material exhibits relatively low transmissivity, e.g. is opaque or darkly translucent. Some switchable materials used in smart glass allow for transitional or intermediate states between the transmissive and light-blocking state, e.g. for dimming. Depending on the switchable glass product used to implement the optical modulator 4, the light modulation may involve switching between the transmissive state (light ON, e.g. 70% or more) and the light-blocking state (light at least substantially OFF, e.g. 10% or less); or the light modulation may involve switching between one or more of the ON/OFF states and one or more intermediate states (e.g. between four states such as ≤10%, 25-35%, 50-60% and ≥70%). Presently used switchable glass (also known as smart glass) products utilize several different types of technologies for the switchable layer, such as: suspended particle device (SPD) electrochromic, micro-blind and polymer dispersed liquid crystal (LC) devices. These types of devices change states in response to an applied voltage. A variant uses a similar switchable layer in the form of a smart switchable film, which may be attached to a desired substrate such as a transparent (e.g. glass) window pane. Drawbacks of current examples of these switchable materials may be the need to apply the voltage to achieve the transmissive state (which may impact power consumption for modulated daylighting applications) and slow switching speed (which may not adequately support high data rate light-communication applications). The switchable glass example outlined above is just one example of a technology that may be used to implement an optical modulator. Another alternative may be a mechanical shutter driven by an actuator to open, close or partially open in response to a control signal. It is contemplated that the modulator may include one or more of the switchable glass element, the switchable thin-film element and the mechanical shutter described above.

The example PV powered daylighting device 100 shown in FIG. 1A may also include the optional daylighting controller 107, that controls the optional optical modulator 109 of the PV powered daylighting device 100. An example daylighting controller 107 includes logic/processor circuitry coupled to control the optical modulator 109 to modulate the light emitted from the passive lighting device into the interior region of the structure either to reduce or increase the intensity of light passed by the daylighting device or to modulate the passed light with data in a manner to minimize or prevent perception of the data modulation by an occupant in the interior region of the structure. An example daylighting controller 107 is described below with reference to FIG. 4B.

Although the optical modulator 109 and the associated daylighting controller 107 are powered by the PV device 104 to run its internal circuitry as well as to drive the operations of the modulator 109, the daylighting device 103 is "passive" in that the light supplied to the illuminated interior region or space is collected and/or distributed, not generated by the device 103. When the optional modulator is omitted, receiver functions of the daylighting transceiver 106 may not be needed and the PV device may be used to power a daylighting transmitter 110 instead of the daylighting transceiver 106, as shown in FIG. 1C.

Figure 2A:
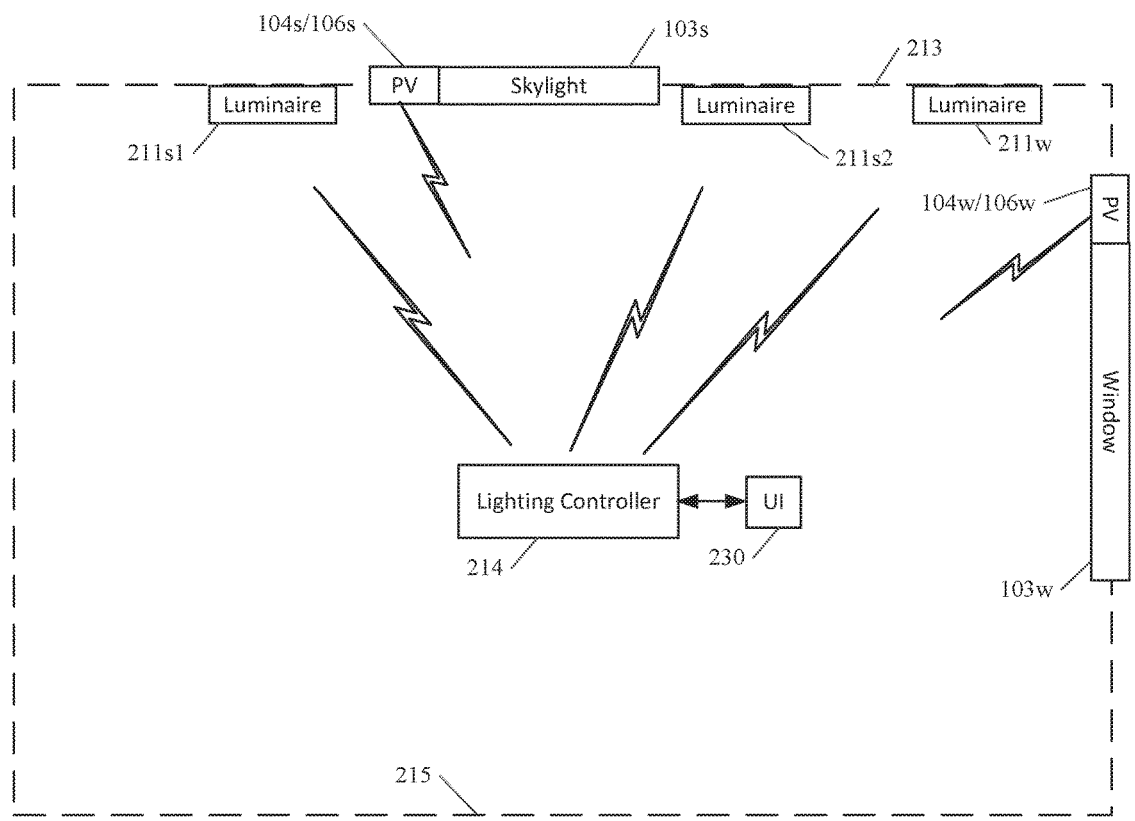
FIG. 2A is a side-plan view showing a room with a skylight, a window and multiple controlled luminaires.

FIG. 2A is a simplified side-plan view of a room 215 that includes two PV powered daylighting devices 103, a skylight 103$s$ and a window 103$w$. The room also includes three luminaires, two luminaires 211$s$1 and 211$s$2 on either side of the skylight 103$s$ and a luminaire 211$w$ that illuminates an area of the room 215 that is also illuminated by light from the window 103$w$. The luminaires 211$s$1, 211$s$2 and 211$w$ are controlled by a lighting controller 214 based on signals received from the PV powered skylight 103$s$ and the PV powered window 103$w$. The lighting controller 214 is coupled to receive commands from a user interface (UI) device 230.

Briefly, the lighting controller 214 receives commands from the user interface 230. These commands may cause the controller to turn on, turn off or dim the luminaires 211. In addition, the UI device 230 may include a presence sensor, such as a pyroelectric IR (PIR) sensor (not shown) that detects the presence of a person in the area 213 of the premises 215 to provide turn-on and turn-off commands to the lighting controller 214. The example lighting controller 214 also receives signals from the daylighting transceivers 106 of the PV powered skylight 103$s$ and PV powered window 103$w$. These signals indicate the light intensity sensed by the PV devices 104$s$ and 104$w$ (or optional photosensors 108) that are associated with the skylight 103$s$ and window 103$w$, respectively. As described below with reference to FIG. 4A, the lighting controller 214 includes a processor and a control program. The control program calculates the respective light intensities in the room that correspond to the intensity readings provided by the PV devices or photosensors. The controller 214 then sends signals to the luminaires 211$s$1, 211$s$2 and 211$w$ to adjust the artificial light provided by the luminaires to achieve a desired total illumination level in the area 213 as indicated by the commands entered using the UI device 230. The lighting controllers 214 shown in FIGS. 2A and 2B implement an open-loop lighting control; there is no feedback to determine whether the desired lighting level has been achieved. It is contemplated, however, that the lighting controller 214 may be coupled to an optional sensor (not shown in FIG. 2A) that provides such a feedback signal, allowing the lighting controller to implement closed-loop control of the luminaires.

The example room 215 shown in FIG. 2A does not include optical modulators on either of the daylighting devices 103. It is contemplated, however, that one or both of these devices may include optical modulators that can be controlled by the lighting controller 214 to increase or reduce the intensity of light provided by the daylighting devices to achieve a desired lighting level in the room. It may be desirable to control the optical modulators to reduce light levels provided by the daylighting devices, for example, when a user has entered a dimming command using the UI device 230 and the calculated light intensity provided by the daylighting devices is greater than the desired dimmed light level.

Figure 2B:
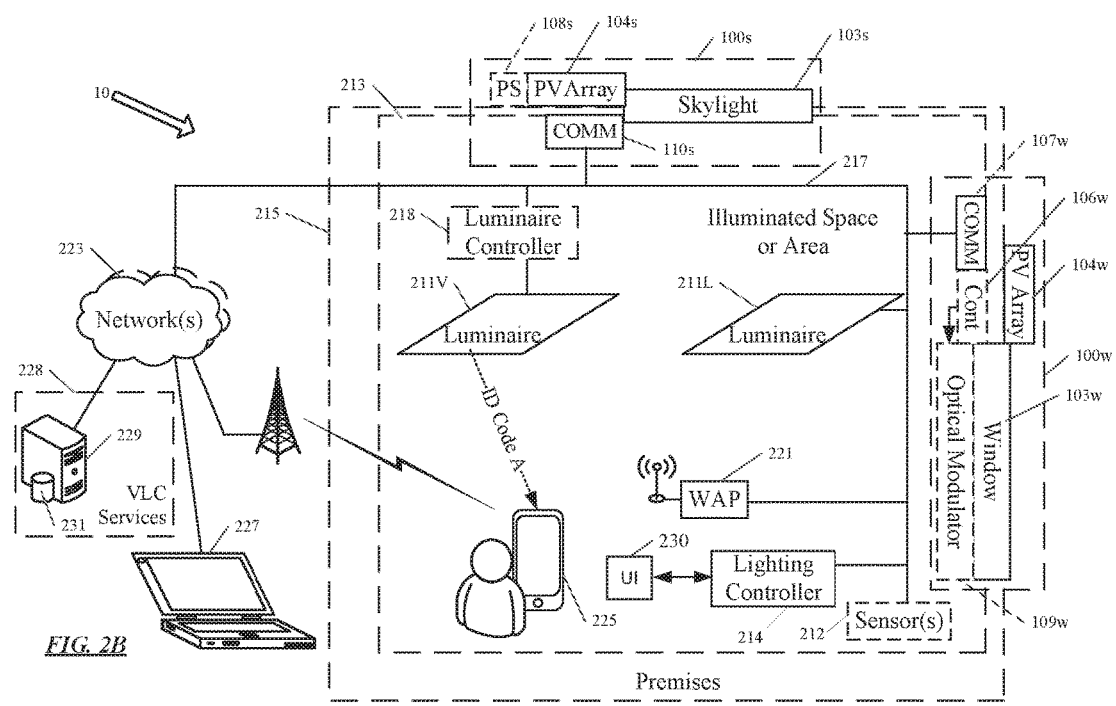
FIG. 2B is a simplified functional block diagram of an example system including daylighting devices, luminaires, sensors, PV devices and controllers.

FIG. 2B is a simplified functional block diagram of an overall system 10 offering external light using two example PV powered daylighting devices 100s and 100w. As shown, the system 10 also includes regular luminaires 211, which are powered to provide artificial lighting. As discussed more later, one or more luminaires 211v may also be controlled to modulate the artificial light output(s) thereof to support visual light communication. FIG. 2B also shows several types of other elements that may use or communicate with/through the visual light communication system 10.

The PV powered daylighting devices 100s and 100w, the luminaires 211, as well as some other elements of or coupled to the system 10, are installed within the space or service area 213 to be illuminated at a premises 215. The premises 215 may be any location or locations serviced for lighting and other purposes by a system 10 of the type described herein. Most of the examples discussed below focus on indoor building installations, for convenience. Hence, the example of system 10 provides lighting and, optionally, visible light communication, in a number of service areas in or associated with a building, such as various rooms, hallways, corridors or storage areas of a building. Any building forming or at the premises 215, for example, may be an individual or multi-resident dwelling or may provide space for one or more enterprises and/or any combination of residential and enterprise facilities. A premises 215 may include any number of such buildings; and, in a multi-building scenario, the premises may include outdoor spaces and areas between and around the buildings, e.g. in a campus configuration. The system 10 may include any number of daylighting devices 103 and any number of luminaires 211 arranged to illuminate each area 213 of the particular premises 215.

Although the PV powered daylighting devices 100 and luminaires 211 may operate and/or be controlled separately by any convenient means; in the example, control functions as well as some possible transport of information to devices 100 and/or 211 utilize a data network 217 at the premises 215. Any suitable networking technology (communication media and/or protocol) may be used to implement the data network 217. In particular, the data network 217 may be a wireless network implemented using communications interfaces in each of the components as described below with reference to FIGS. 4A through 4D.

Like the PV powered daylighting device 100 in FIG. 1A through 1C, each example PV powered daylighting device 100s or 100w in FIG. 2B includes a daylighting element 103s or 103w, a PV device 104, and a daylighting transceiver 106 or daylighting transmitter 110. The device 103w is shown as having an optional associated optical modulator 109w. Although not shown, there may be additional daylighting devices that do not have PV devices or modulators. The light intensity provided by the unpowered daylighting devices may be ignored by the lighting controller 214 or may be assumed to be the same as the lighting intensity provided by the PV powered daylighting device(s). For discussion purposes, daylighting element 103s is a passive element of a skylight, whereas the passive optical element 3w is a passive element of a window. Also, in this example, the optional optical modulator 109s is associated with an output of the corresponding passive window element 103w. As noted earlier, however, an optional optical modulator may be coupled to either input or output or included within the structure of the passive element(s) of any type of daylighting device, including PV powered daylighting devices 100.

The system elements, in a system such as system 10 of FIG. 2B, may include any number of luminaires 211 for artificial lighting as well as one or more lighting controllers 214, for each illuminated area 213 of the premises 215. Lighting controller 214 may be configured to control lighting related operations (e.g., ON/OFF, intensity, brightness, color characteristic) of any one or more of the luminaires 211 and one or more PV powered daylighting devices 100 that include an optical modulator 109. That is, lighting controller 214 may include or be embodied in a user interface (UI) device such as a switch, a dimmer, or a smart control panel including a user interface depending on the functions to be controlled through device 214. The lighting system elements may also include one or more sensors 212 used to control lighting functions, such as occupancy sensors or ambient light sensors. Other examples of sensors 212 include light or temperature feedback sensors that detect conditions of or produced by one or more of the lighting devices. If provided, the sensors may be implemented in intelligent standalone system elements such as shown at 212 in the drawing, or the sensors may be incorporated in one of the other system elements, such as one or more of the PV powered daylighting devices 100 or the luminaires 211 and/or the lighting controller 214, In the example, one or more of the luminaires 211 are regular artificial lighting devices controlled to provide illumination, with the control communications to/from the appropriate lighting controller 214 and/or sensor 212 implemented via the data network 217 at the premises. Hence, in the example, regular luminaires include a network connected controller 218. By way of example, the luminaires 211 (with controllers 218), the sensor(s) 212, the lighting controller(s) 214, and the data network 217 may be implemented as disclosed in U.S. Pat. No. 9,001,317 by Ramer et al. and/or in US Patent Application Publication No. 2015/0043425 by Aggarwal et al., the entire contents of both of which are incorporated herein by reference.

In the example, one or more of the modulated luminaires 211v has an optional associated controller 218. In addition to responding to state control communications from a lighting controller 214 and/or a sensor 212, in a manner similar to the control function of the regular luminaire 211, the controller 218 controls operation of the modulated luminaire 211v to modulate the light output thereof to represent or carry information/data. Although shown separately for convenience, the controller 218 may be incorporated into the physical structure implementing or housing the light source of the modulated luminaire 211v.

As outlined above, the optional on-premises system elements such as the daylighting controller 107w, the sensor 212, and the luminaire controller 218, in the example system 10 of FIG. 2B, are coupled to and communicate via a data network 217 at the premises 215. The data network 217 in the example also includes a wireless access point (WAP) 221 to support communications of wireless equipment at the premises. For example, the WAP 221 and network 217 may enable a user terminal for a user to control operations of any lighting device 211 at the premises 213. Such a user terminal is depicted in FIG. 2B, for example, as a mobile or other portable handheld type device 225 within premises 215, although any appropriate user terminal may be utilized. However, the ability to control operations of a lighting device 211 may not be limited to a user terminal accessing data network 217 via WAP 221 or other on-premises access to the network 217. Alternatively, or in addition, a user terminal such as laptop 227 located outside premises 215, for example, may provide the ability to control operations of one or more lighting devices 211, PV powered daylighting devices 100 and/or optional daylighting controller 107w or 218 via one or more other networks 223 and the on-premises network 217. Network(s) 223 includes, for example, a local area network (LAN), a metropolitan area network (MAN), a wide area network (WAN) or some other private or public network, such as the Internet.

For lighting operations, the optional system elements for a given service area (107w, 212, and 218) may be coupled together for network communication with each other through data communication media to form a portion of a physical data communication network 217. Similar elements in other service areas like 213 of the premises 215 may be coupled together for network communication with each other through data communication media to form one or more other portions of the physical data communication network 217 at the premises 215. The various portions of the network in the service areas in turn may be coupled together to form a data communication network at the premises, for example to form a LAN or the like, as generally represented by network 217 in FIG. 2B. Such data communication media may be wired and/or wireless, e.g. cable or fiber Ethernet, Wi-Fi, Bluetooth, or cellular short range mesh; and the network 217 may support one or more communication protocols suitable for or specifically adapted to the particular media implementing the network 217. In many installations, there may be one overall data communication network 217 at the premises. However, for larger premises and/or premises that may actually encompass somewhat separate physical locations, the premises-wide network 217 may actually be built of somewhat separate but interconnected physical networks utilizing similar or different data communication media and protocols.

In the example, the overall system 10 also includes server 228 having computer 229 and database 231 accessible to a processor of a computer 228 programmed as the server 228. Such a computer, for example, typically includes the processor, a network communication interface and storage coupled to be accessible to the processor. The storage can be any suitable hardware device (and use any suitable protocol) that stores the sever programming for execution by the processor, to configure the computer 229 as server 228. The storage may also contain the database 231, or the database may reside in other storage, e.g. on a hardware platform coupled to the computer or coupled for communication with the computer running the server programming through a network.

Although FIG. 2B depicts server 228 as located outside premises 215 and accessible via network(s) 223, this is only for simplicity and no such requirement exists. Alternatively, server 228 may be located within the premises 215 and accessible via network 217. In still another alternative example, server 228 may be located within any one or more system element(s), such as lighting device 211, lighting controller 214 or sensor 212. Similarly, although FIG. 2B depicts database 231 as physically proximate server 229, this is only for simplicity and no such requirement exists. Instead, database 231 may be located physically disparate or otherwise separated from server 228 and logically accessible by server 228, for example, via network 217 or one of the networks 223.

Communication with the server 228 and database 231 can support operations of the system elements at the premises 215, e.g. for monitoring and/or automated control of lighting. For purposes of the present discussion, however, the server 228 and database 231 may be involved in one or more ways with the visual light communication operations of the system 10, including the light communications via the daylighting device 100w. The same or other network equipment may also monitor and control aspects of the light communication operations, e.g. to identify devices using light communication services, determine amounts of usage of the services, and/or control ID codes or other aspects of the light based communication transmissions from the devices 100w and 211v.

In an application providing indoor position determination and/or related location based information, for example, a mobile device 225 includes a light sensor and is programmed or otherwise configured to demodulate lighting device ID codes from a signal provided by the light sensor of the mobile device. In a typical mobile device example, the included light sensor is an image sensor, such as a camera (e.g. a rolling shutter camera or a global shutter camera). In such a mobile device 225, the programming for the processor configures the device 225 to operate the image sensor to capture one or more images that include representations of at least one modulated passive optical device 100w and/or at least one modulated luminaire 211v and to process data or other signal of the image(s) to demodulate one or more lighting device ID codes from the captured image(s). In such an image sensor based example, the image processing to recover ID codes captures one or more such codes which may have been sent by a modulated passive lighting device 100w and/or a modulated luminaire 211v in the vicinity of the device 225. The relevant modulated light content, e.g. from a particular device 100w or 211v, in any captured image depends on the position and orientation of the mobile device 225 and thus of its image sensor at the time of image capture.

One or more lighting device ID codes obtained from processing of the captured image(s) may then be used in a table lookup in the database 231 (or in a portion of the database downloaded previously via the network(s) 223 to the mobile device 225), for a related mobile device position estimation and/or for information retrieval functions. For example, the mobile device 225 may use its inherent RF wireless communication capabilities to communicate through the network(s) 223 for assistance in a precise position estimation based ID codes for on one or more of the luminaire 211v or daylighting device 100w based on the codes alone or in combination with mobile device orientation data. As another example, the mobile device 225 may use its inherent RF wireless communication capabilities to communicate through the network(s) 223 to obtain other position or location related services such as routing instructions or product or service promotions related to estimated mobile device position. Alternatively, the position estimation or retrieval of information for location related services may utilize a smaller relevant subset of the database 231 corresponding to all or part of a particular premises 215, which was downloaded to the mobile device 225 via an earlier network communication prior to image capture, e.g. upon entry to the area 213 or the particular premises 215.

Indoor positioning systems have been developed that rely on ID codes of modulated luminaires like 211v; and in such systems, the database maps the stored ID codes to position estimation information and/or other location-related information. Examples of such systems are disclosed in U.S. Pat. No. 9,287,976 to Ganick et al. and US Patent Application Publication No. 2015/0147067 to Ryan et al., the entire contents of both of which are incorporated herein by reference. The database 231 in the system 10 may include similar information but also includes ID codes of the modulated passive lighting devices such as PV powered daylighting device 100w and maps those additional codes to similar corresponding position estimation information and/or other location-related information corresponding to locations of modulated daylighting devices such as device 100w.

As another example of light based communication via the system 10, if the networks and visual light communication capabilities provide a high enough data rate, the server 229 may send user data over the networks 223 and 217 to one or more of the controllers 107w or 218 to modulate the data onto light output from a modulated daylighting device 100w or a modulated luminaire 211v, for reception by a user terminal device such as mobile device 225. Upstream communications from the user's mobile device 225 may use uplink light communication elements not shown or may use the wireless communication capability of the device 225, e.g. via the wireless access point 221 or a cellular network tower coupled to the network(s) 223.

Figure 3A:
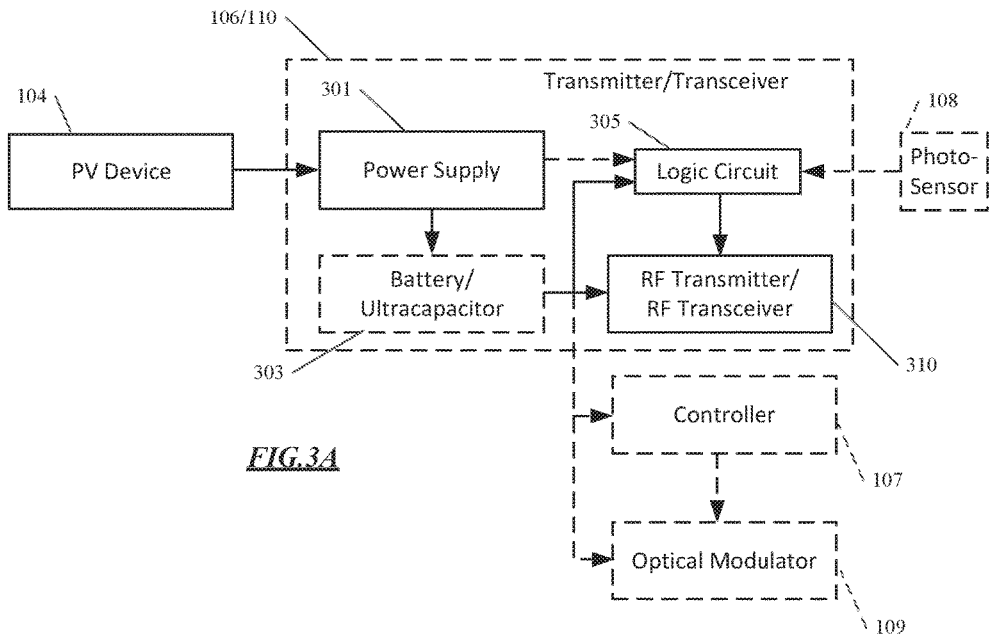
FIGS. 3A and 3B are block diagrams, partly in schematic diagram form of electrical circuitry that may be included in the example system shown in FIG. 2B.
Figure 3B:
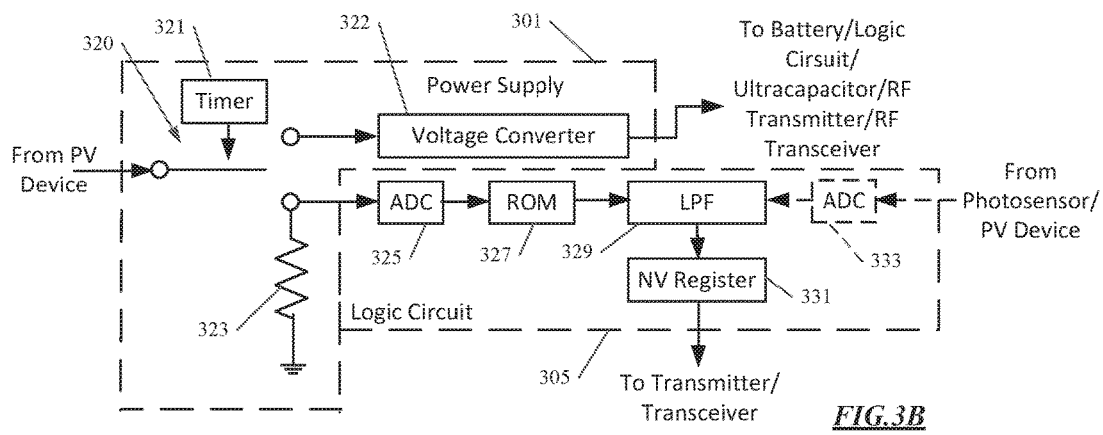

FIGS. 3A and 3B are block diagrams, partly in schematic diagram form, of example circuits that may be used as the daylighting transceiver 106 or daylighting transmitter 110 shown in FIGS. 1A-1C, 2A and 2B. For the sake of brevity, the circuits shown in FIGS. 3A and 3B are described as the daylighting transceiver 106. These circuits may be transformed to become transmitter circuits by deleting or disabling the receiver functions. The transceiver circuit shown in FIG. 3A includes a power supply 301 that is coupled to receive the power output signal of the PV device 104. The power supply provides operational power to the other elements of the daylighting transceiver 106 such as the logic circuit 305, RF transceiver 310 and optional battery or ultracapacitor 303. In addition, the power supply provides operational power to the optional controller 107 and optical modulator 109.

The example logic circuit 305 collects data from the PV device 104 and/or the optional photosensor 108 to provide a measure of light intensity to the RF transceiver 310. A PV device operates essentially as a current source providing power signal having a substantially constant (e.g. ±5% to 10%) voltage at current levels determined by the solar intensity when the load resistance is relatively high. Depending on the intensity of the sunlight and the load resistance, however, the output voltage of the PV device 104 may vary as well. The power supply circuit 301 shown in the example of FIG. 3A includes a switched DC to DC voltage converter 322 that converts a variable input voltage to a substantially constant (i.e. ±5% to 10%) output voltage. In one implementation, the PV powered daylighting devices 100 each includes an energy storage device such as a battery 303 that is charged by the PV device 104 and the various circuit elements receive operational power from the battery. This implementation may be problematic, however, as batteries eventually need to be replaced and the location of the daylighting device, for example, in a high ceiling, may make it difficult to service. As a first alternative, the battery may be replaced by an ultracapacitor (also known as a supercapacitor). While ultracapacitors typically store on the order of one-tenth of the power of a rechargeable battery of equal size, they can be charged more quickly than a battery and, thus, may be more suited to solar power conversion which may be subject to rapid changes in power due to corresponding rapid changes in light intensity that may occur, for example, on a windy day with rapidly moving clouds.

As a third alternative, the circuit shown in FIG. 3A may not include an energy storage device and may be powered directly by the PV device, possibly using conventional filter capacitors (not shown) in the output of the voltage converter to mitigate power fluctuations. This alternative may be desirable as little or no maintenance of the daylighting device would be needed after installation and the daylighting device would only need to transmit the light intensity signal to the lighting controller 214 at times when the light intensity is sufficient to drive the circuitry directly. In this implementation, the lack of a light intensity signal may be interpreted as directing the lighting controller 214 to provide the desired light level specified by the UI device 230 using only the luminaires 211.

FIG. 3B shows details of the power supply 301 and logic circuit 305 shown in FIG. 3A. Although the logic circuitry is shown as an arrangement of discrete elements, it is contemplated that one, more or all of the elements may be replaced by a microcontroller, microprocessor, application specific integrated circuit (ASIC) or field programmable gate array (FPGA) that is programmed or configured to perform the same functions. The circuitry shown in FIG. 3B includes two different methods for measuring the intensity of light provided to the PV powered daylighting device 100. The first method measures the power output of the PV device 104 while the second method measures the voltage provided by the optional photosensor 108. Although not shown, the circuitry shown in FIG. 3B is synchronized by a clock signal generated by a clock signal generator. The clock signal controls the operation of the timer 321, the analog-to-digital converters (ADCs) 325 and 329 the low-pass filter (LPF) 329 and the non-volatile register 331.

The first method uses the timer 321, switch 320, resistor 323, ADC 325 and read only memory (ROM) 327. This method assumes that the daylighting transceiver circuit 106 includes some energy storage, such as the battery/ultracapacitor 303 or the filter capacitors (not shown) of the DC to DC voltage converter, described above. The switch 320 is a single pole double throw (SPDT) switch controlled by timer 321. At predetermined times, the timer 321 causes the switch to direct the output signal from the PV device 104 through the resistor 323. The ADC 325 then digitizes the voltage across the resistor 323 and provides the digital value to the ROM 327. The ROM 327 is programmed to produce a value equal to the square of the voltage value divided by the resistance value of the resistor 323 ($V^2/R$). As is well known, this value is equal to the power dissipated by the resistor 323. For a resistor having a relatively low resistance (e.g. 10 to 100 Ohms), this value provides a measure of the power produced by the PV device, which, in turn, provides a measure of the intensity of the sunlight on the PV device. The output values provided by the ROM 327 are applied to the LPF which may be, for example, an finite impulse response (FIR) filter. An example FIR filter may have a cut-off frequency between 0.05 and 0.001 Hz. The LPF reduces the variations of the output signal of the ROM 327 to compensate for rapid variations in light intensity which may occur, for example, on days with rapidly moving clouds. The example timer samples the output power of the PV device 104 at regular intervals equal to twice the cut-off frequency of the LPF 329. Each sampling interval may be very short, engaging the resistor only for an amount of time needed to stabilize the voltage across the resistor 323. After measuring the voltage, the timer 321 causes the switch 320 to direct power from the PV device to the voltage converter 322.

The voltage converter 322 converts the voltage signal provided by the PV device 104 to a target output voltage level that is compatible with the energy storage device or with the daylighting transceiver 106 if the system does not use an energy storage device. In this example, the voltage converter is a switched DC to DC converter that is configured to convert a wide range of voltage signals provided by the PV device to the target voltage level.

The second method for measuring the intensity of the light provided to the PV device employs the optional photosensor 108, which may be a photoresistor having a resistance that is inversely proportional to the light intensity. In this implementation, the analog voltage level provided by the photosensor 108 is digitized by an optional ADC 333 and filtered by the LPF 329. The values produced by the LPF 329 are stored in the non-volatile register 331 for transmission by the daylighting transmitter of the daylighting transceiver 106, as described above. As shown in FIG. 3B, it is contemplated that the output voltage of the PV device 104 may be used instead of the voltage signal from the photosensor 108. While this voltage may not provide an accurate indication of the light intensity on the PV device 104, it may be sufficient for the operation of the system. For example, voltage levels less than a desired output voltage of the PV device may indicate that light provided by the daylighting elements 103 should be supplemented with artificial light from the luminaires to achieve an acceptable lighting level in the service area while voltage levels at the desired output voltage may indicate that no supplemental light is to be provided.

FIG. 4A is a simplified functional block diagram of an example lighting controller 214. The lighting controller 214 includes a processor 435 coupled to communicate via a communication interface 437, which in this example provides communications functions for sending and receiving data via the network 217 shown in FIG. 2B. The particular type of interface 437 depends on the media and/or protocol(s) of the applicable network 217 at the premises. In the described examples, the communication interface 437 includes a controller transmitter, or a controller transceiver. The controller transceiver may include a separate controller transmitter and controller receiver (not separately shown). The lighting controller may also receive signals from sensors 212 such as a presence sensor a temperature sensor and/or an ambient light sensor. The processor 435 is coupled to the UI device 230 to receive lighting commands from users in the service area.

The processor 435 is an electronic circuit device configured to perform processing functions like those discussed herein. Although the processor circuit may be implemented via hardwired logic circuitry; in the examples, the processor 435 is a programmable processor such as a programmable central processing unit (CPU) of a microcontroller, microprocessor or the like. Hence, in the example of FIG. 4A, the controller 214 also includes a memory 439, storing programming for execution by the CPU circuitry of the processor 435 and data that is available to be processed or has been processed by the CPU circuitry of the processor 435.

The processor 435 and memory 439 and possibly the communication interface 437 may be separate hardware elements as shown; or the processor 435 and memory 349 and possibly the communication interface 437 may be incorporated together, e.g. in a microcontroller or other 'system-on-a-chip.'

One implementation of the communications interface 437 of the lighting controller 214 is shown in FIG. 4B. This interface includes two radios, a wireless transmitter or transceiver 462 operating at in a frequency band at approximately 900 MHz (e.g. ±10 MHz) (e.g. the controller transceiver or controller transmitter and controller receiver) and a BLE wireless transceiver. Both of these devices are coupled to the processor 435. The BLE transceiver is used primarily for commissioning. Each lighting device (daylighting device or luminaire) is assigned an identification (ID) value which is used to send commands to the device. The ID value may also be used as VLC location data transmitted by the device. In one example, commissioning occurs using a mobile device, such as the mobile device 225 shown in FIG. 2B. The ID value assigned to the lighting device may be associated with a location. The location may be stored in a memory, preferably non-volatile (not shown), in the lighting device or in the central server 228 that may be accessed by a mobile device using the ID value received in a VLC communication to determine the location of the mobile device.

In this implementation, the 900 MHz transceiver 462 is used to receive the light intensity data from the PV powered daylighting devices 100. The transceiver 462 may also be used to send commands to the daylighting devices 100 that include the optional modulators 109 to send VLC data or to attenuate the light provided by the daylighting devices when the desired light level input via the UI device 230 is lower than the light level currently provided by the daylighting devices 100. As described above, in some implementations, the PV powered daylighting device 100 may use a transmitter rather than a transceiver. In these implementations, the 900 MHz transceiver 462 used in the lighting controller 214 may include a 900 MHz receiver.

FIG. 4C is a simplified functional block diagram of general lighting luminaire 111v, together with an associated controller 218. The luminaire 111v, for example, includes a light source 441; and the luminaire controller 218v includes a suitable driver circuit 443 for providing power to the light source 441 and for modulating the light provided by the light source 441. For example, if the light source 441 is a light emitting diode (LED) based source (including one or more LEDs), the driver 443 converts available AC (or possibly DC) power to current to drive the number of LEDs in the source 441 to achieve a desired light level. Of course other types of light sources and corresponding driver circuits may be used. In this example, the circuit 443 is also of a type capable of modulating the drive power supplied to the light source 441 to modulate the light output from the source 441.

The luminaire controller 218v includes a processor 445 coupled to control the operation of the light source via the driver/modulator circuit 443. The processor 445 also is coupled to communicate via a communication interface 447, which provides a communications functions for sending and receiving data via the network 217 shown in FIG. 2B. The particular type of interface 447 depends on the media and/or protocol(s) of the applicable network 217 at the premises. In the described examples, the communications interface includes a luminaire transceiver or a luminaire receiver (not separately shown).

The processor 445 is an electronic circuit device configured to perform processing functions like those discussed herein. Although the processor circuit may be implemented via hardwired logic circuitry, in the examples, the processor 445 is a programmable processor such as a programmable central processing unit (CPU) of a microcontroller, microprocessor or the like. Hence, in the example of FIG. 4C, luminaire controller 218 also includes a memory 449, storing programming for execution by the CPU circuitry of the processor 445 and data that is available to be processed or has been processed by the CPU circuitry of the processor 445. The processors and memories in controllers 218 for the modulated luminaires 111v may be substantially the same throughout the system 10 of FIGS. 2A and 2B at the premises 215, or different controllers 218 may have different processors 445 and/or different amounts of memory 449, depending on differences in intended or expected processing needs for luminaires at different locations throughout the premises 215.

In the example, each luminaire controller 218 has the processor 445 and a memory 449 that holds programming and a data set to implement regular luminaire control as well as desired visual light based communications. In an indoor positioning application, for example, the programming would enable the processor 445 to communicate through the interface 447 and network(s) 217, 223 (FIG. 2B) with a commissioning or management server, e.g. to receive an assigned ID code. In the indoor positioning application example, programming would enable the processor 445 to control driver/modulator 443 to modulate power supplied to the light source 441 with the assigned ID and thus modulate the output of the light source 441 to thereby broadcast the assigned ID code in the area illuminated by the luminaire 111v.

The controller 218 also may receive lighting commands from the controller 214 and/or data to be transmitted by VLC via the network(s) 217 and 223 and the interface 447. The data to be transmitted to user devices via the visual light communication capabilities of the controller 218 and luminaire 111v is used to modulate the light source 441. In such a case, the programming enables the processor 445 to process received data, as may be appropriate, and forward the received data as control signals for the driver/modulator 443. The signals and/or commands thus supplied to the driver/modulator 443 cause driver/modulator 443 to modulate power supplied to the light source 441 according to the commands and/or processed data and thereby modulate the output of the light source 441 to change its illumination characteristics, responsive to commands, or to broadcast data on the modulated light output of the light source 441 into the service area illuminated by the luminaire 111v.

Figure 4D:
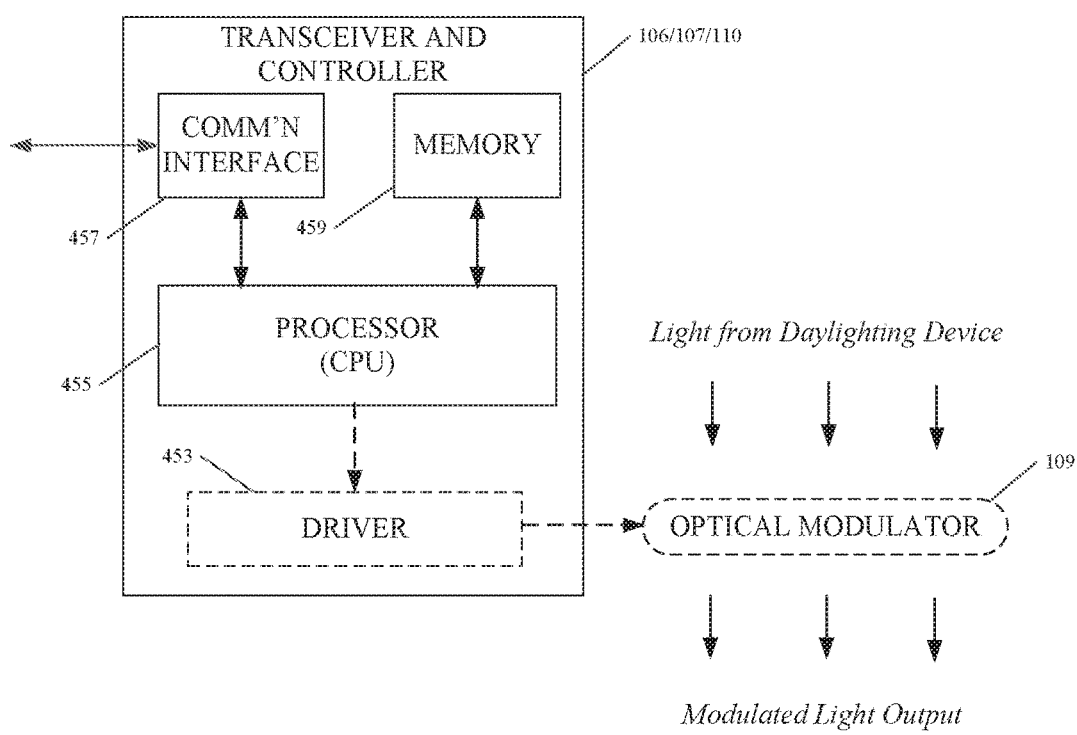

FIG. 4D is a block diagram of an example circuit that may be used as the daylighting transceiver 106, daylighting transmitter 110 and/or controller 107 for a PV powered daylighting device such as the device 100w shown in FIG. 2B. The circuitry includes a processor 455, communications interface 457 and memory 459 that are essentially the same as the processor 445, communications interface 447 and memory 439, described above with reference to FIG. 4C. In the described examples, the communication interface 457 includes a daylighting transmitter, or a daylighting transceiver. The daylighting transceiver may include a separate daylighting transmitter and daylighting receiver (not separately shown). In addition, the daylighting circuitry includes an optional driver 453 and modulator 109 that are configured to modulate the daylight passed by the daylighting element 103w in the PV powered daylighting device 100w. The configuration described below implements the daylighting transceiver 106 and controller 107. When the circuitry shown in FIG. 4D is used to implement just the daylighting transceiver 106, the driver 453 and optical modulator 109 may be eliminated, the processor may be the logic circuitry 305 (shown in FIGS. 3A and 3B) and the communications interface 457 may be the circuitry shown in FIG. 4B. When the circuitry is used to implement just the daylighting transmitter 110, the driver 453 and optical modulator 109 may be eliminated, the processor may be the logic circuitry 305 and the communications interface may be the 900 MHz wireless transmitter shown in FIG. 4B.

As outlined above, the processor 455 controls the optional modulator 109 via the driver 453 to vary one or more characteristics of the light supplied by a daylighting element to illuminate a particular space; and that modulation may also provide visual light communication, e.g. of a device ID and/or other information such as data intended for a user device, such as a mobile device 225 (shown in FIG. 2B), in the particular space. The processor 455, the driver 453 and/or the optical modulator 109 may be configured to implement any of a variety of different light modulation techniques. The controlled operation of the modulator 109, for example, may vary intensity, color characteristics of passive illumination and/or possibly even a pattern of characteristics of light across the output of the daylighting element 103w into the illuminated space. A few examples of specific light modulation techniques that may be used include amplitude modulation, optical intensity modulation, amplitude-shift keying, frequency modulation, multi-tone modulation, frequency shift keying (FSK), ON-OFF keying (OOK), pulse width modulation (PWM), pulse position modulation (PPM), ternary Manchester encoding (TME) modulation, and digital pulse recognition (DPR) modulation. Other modulation schemes may implement a combination of two or more of these modulation techniques.

Figure 4E:
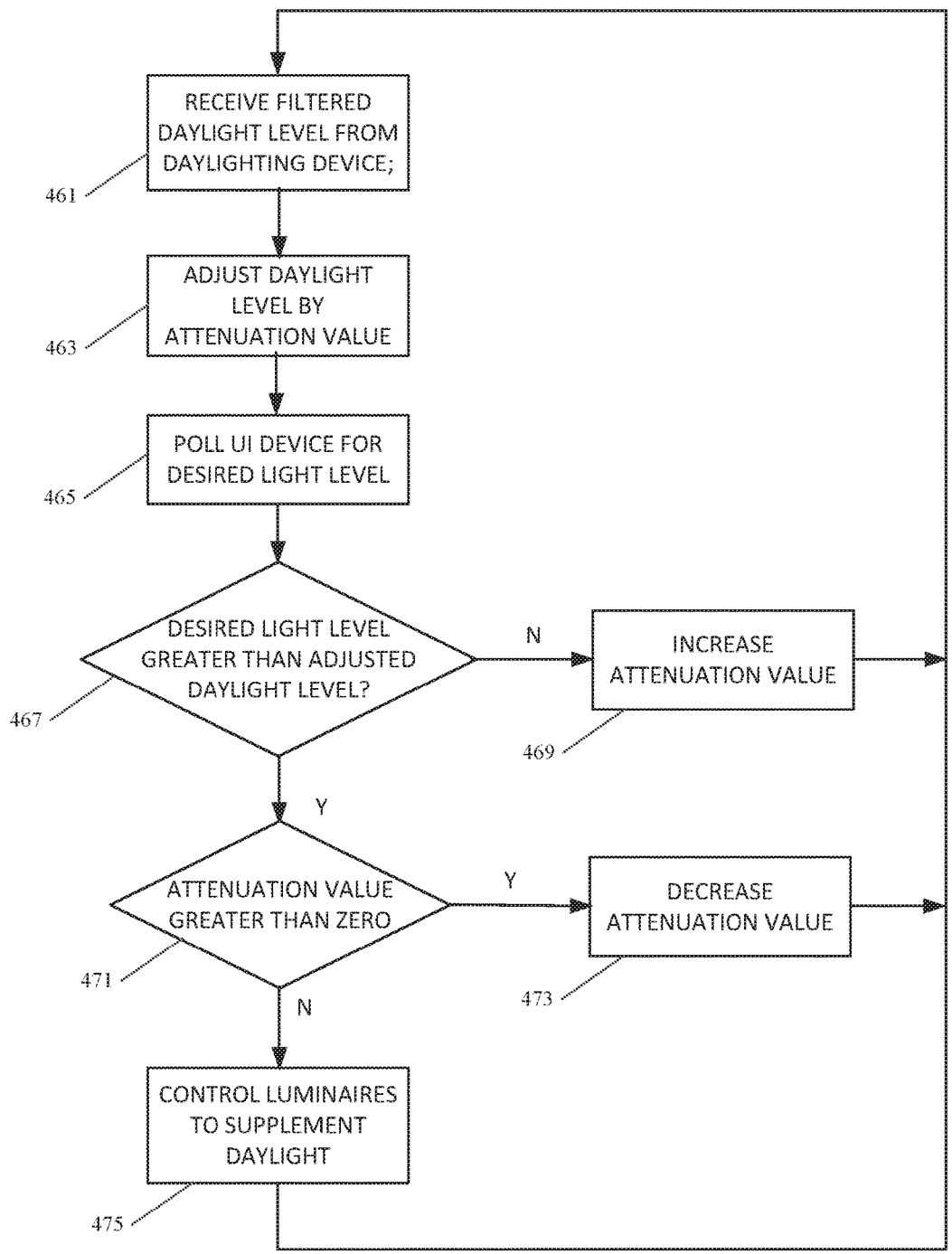
FIG. 4E is a flow-chart diagram that illustrates an open-loop control process that may be used with the circuitry shown in FIGS. 4A-4D.

FIG. 4E is a flow-chart diagram that illustrates an open-loop control process that may be used with the circuitry shown in FIGS. 4A-4D. In this example, the process is executed by the processor 435 of the lighting controller shown in FIG. 4A. It is contemplated, however, that it could be executed by another processor in the venue that is coupled to the various elements shown in FIG. 3B via the networks 417 and/or 423. The process described below is for a single PV powered daylighting device configured to illuminate a single service area. It is contemplated that it may be extended to multiple PV powered daylighting devices 100 configured to illuminate a single service area or multiple distinct service areas. In addition, the example below assumes that the PV powered daylighting device includes the optional optical modulator 109. For daylighting devices without the optical modulator, blocks 463 and 467-473 may be eliminated.

At block 461, the process receives the filtered daylight level value from the daylighting device. As described above, this value is a measure of the intensity of sunlight on the daylighting device. When the daylighting device includes an optical modulator, the modulator will attenuate the light provided by the daylighting device by an amount determined by an attenuation value. Block 463 accounts for this attenuation value by reducing the daylight level by the attenuation value to provide an estimate of the daylight intensity provided by the PV powered daylighting device to the service area.

Next, at block 465, the process obtains the current desired illumination settings from the UI device, this may include polling the UI device or merely reading a register value in the processor 435 indicating the present desired illumination settings. As described above, the desired illumination settings may include intensity, color characteristics and/or a pattern of characteristics of light in the service area. This example assumes that the desired illumination setting is for a desired light intensity in the service area.

At block 467, the process determines whether the desired light level is greater than the adjusted daylight level calculated at block 463. This would indicate that the daylighting element 103, as currently attenuated by the modulator 109 is providing too little light in the service area. If the desired light level is not greater than the adjusted daylight level (i.e. is less than the adjusted daylight level), block 469 increases the attenuation value and branches to block 461.

If, however, at block 467, the desired light level is greater than the adjusted daylight level, block 471 is executed to determine whether the current attenuation value is greater than zero. If it is, then block 473 decreases the attenuation value and branches to block 461. If, at block 471, the attenuation value is zero, block 475 controls the luminaires 211 to supplement the light provided by the PV powered daylighting device 100. After block 475, control transfers to block 461 to receive the next filtered daylight level value.

As described above, if there is insufficient light to power the PV powered daylighting device 100, no filtered daylight level value will be received. In this instance, the process assumes that the level is zero and controls the luminaires 111 to provide the light level requested via the UI device.

The present light control concepts may be implemented by use of an optical modulator in or in combination with a wide variety of different types of passive lighting devices and different types of optical modulators as described above. It may be helpful to consider some examples of types and structures of suitable daylighting elements.

Figure 5:
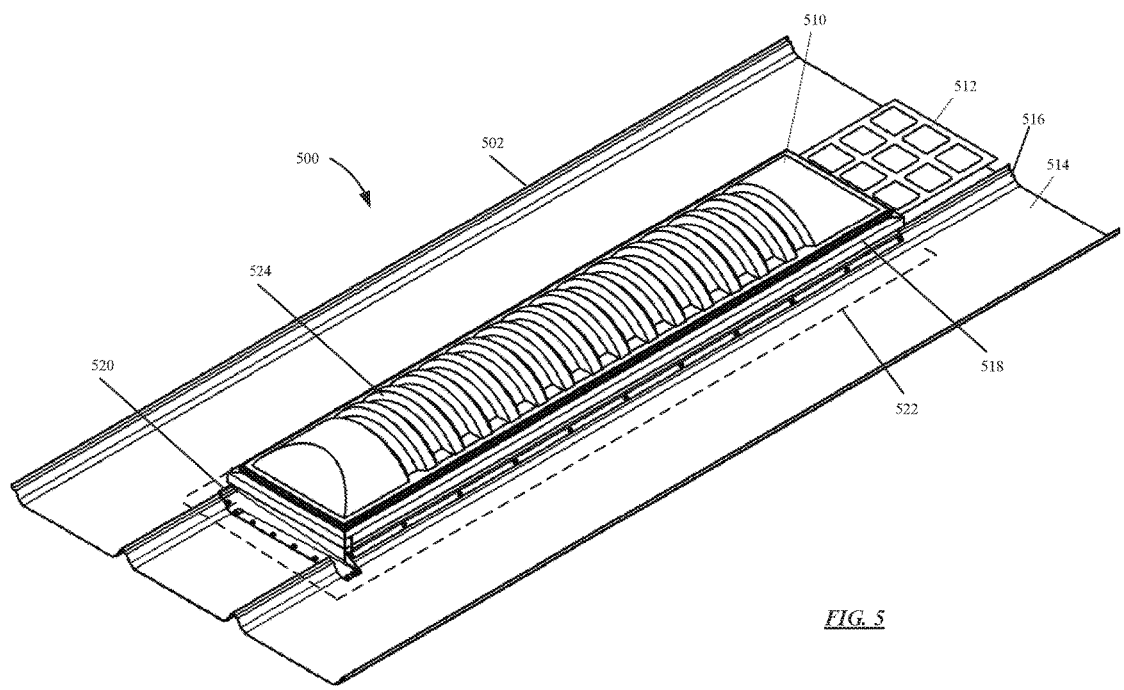
FIG. 5 is a perspective view of a skylight system for a seamed roof.

FIG. 5 shows a system 500 including a skylight 510 and an associated PV device 512. The drawing also shows a rail mounting system adapted to attach the example skylight 510 and PV device 512 to a standing seam panel roof 502. Of course, other mounting systems may be used to attach these or other types of skylights and PV devices to a roof or the like; and/or the illustrated rail mounting system may be used to attach one or more skylights 510 to the major structural elements of any type of roof. Also, the orientations of the skylight 510 is shown by way of example only, and one or more skylights 510 may be mounted at other orientations dependent on the different roof profiles desired for particular building structures.

In the example of FIG. 5, the standing seam metal panel roof 502 has raised rib or rib elevations 516 and panel flats 514 extending between the rib elevations. The system 500 includes of the PV device 512 and the skylight 510 which includes a skylight frame 518, skylight curb 522, and skylight lens 524, The PV device 512 shown in FIG. 5 may be mounted as a cantilever to the skylight frame 518 or may be mounted on the roof by a separate mounting structure (not shown). When the PV device 512 is mounted as a cantilever to the frame 518, the system may include a conduit (not shown) that holds the electrical wiring from the PV device to the skylight 510. When the PV device 512 has a separate mounting structure, that structure may include a conduit for the electrical wiring that extends through the roof, such as the conduit 112 shown in FIG. 1A. While the drawing shows a lens 524 and PV device 512 of particular profile shapes, which may correspond to a rectangular lateral perimeter, it will be understood that each skylight may use a lens and/or PV device of that or a different shape suitable for a particular passive lighting application and/or building aesthetic.

The rail mounting system 500 in the example is configured to prevent water intrusion through the sides of the skylight and rail mounting system. The rail mounting system 500 includes side rails on the frame 518 and a curb 522 that attaches the skylight to the inside of the panel flats 514. A diverter 520, which is a part of the curb 522, is disposed between and adjacent rib elevations 516 of the metal panel roof 502 at the top ends of the side rails of the frame 518. Although not shown, the mounting assembly for the PV array 512 may include a similar diverter.

As another example of a suitable passive lighting device, FIGS. 6A and 6B shows a tubular prismatic skylight 600 and an associated optional optical modulator 609. FIG. 6B also show implementation of the optical modulator at several examples of alternate locations indicated by numeral 609, e.g. within various sections of the tubular prismatic skylight 600. The controller for the modulator 609 is omitted for convenience but could be implemented in a manner similar to controllers discussed above. The tubular prismatic type skylight 600 in the example of FIGS. 6A and 6B is described in greater detail in US Patent Application Publication No. US Pub 2013/0314795 by Scott entitled TUBULAR DAYLIGHTING SYSTEM.

The passive lighting device 600 is implemented as a tubular daylighting system. The device 600 includes a skylight lens 612, a diffuser 614, a square-to-round transition plate 616, a square curb piece 617, an upper straight tubular shaft section 618, a PV device 104, an electrical conduit 112, a daylighting transceiver 106 an optional daylighting controller 107 and an optional optical modulator 609. The optional optical modulator is shown in several alternate positions. The passive lighting device 600 also includes an optional light damper 620, an upper angled tubular shaft section 622, a middle straight tubular shaft section 624, a lower angled tubular shaft section 626, and a lower straight tubular shaft section 628. The device 600 further includes a round-to-square transition piece 630 and a hinging troffer bracket 632. The tubular shaft sections 618, 622, 624, 626, 628 have reflective interior surfaces. The passive lighting device 600 takes light gathered by the skylight lens 612 and transmits the collected light through the system to a ceiling diffuser secured to the ceiling using the hinging troffer bracket 632 either before or after the optional modulator 609 at the end of the round-to-square transition piece 630.

When installed, the square curb piece 617 is incorporated into the roof structure of a building or the like at the premises, and the square-to-round transition plate 616 is mounted on the top side of the square curb piece 617. Upper straight shaft section 618 is suspended from transition plate 616 by inserting inwardly extending tabs provided in circular aperture of the transition plate 616 into slots 644 provided in the upper edge of shaft section 618.

The light damper 620 may be used instead of an optical modulator to adjust the light intensity provided by the daylighting device. The light damper 620 includes a circular light blocking plate rotatably attached to the inside of circular wall of the damper via a pivot pin. The pivot pin extends from and may be controlled by a motor (not shown). The orientation of plate within the wall of the damper 620 can be controlled by rotation of pivot pin, through selective operation of the motor. The damper plate can be rotated to a horizontal disposition in which it blocks light entering the skylight 612 from being transmitted below light damper 620. If damper plate is oriented to a vertical position, virtually all the light collected by the skylight 612 is transmitted below light damper 620.

Upper angled shaft section 622 is suspended from the light damper 620 with threaded fasteners thereby providing an upper bend in the system 600.

The middle straight shaft section 624 is attached to and depends from the upper angled shaft section 622 using a tab and slot interconnection. A number of tabs are formed in an array 665 in the top part of the straight shaft section 624. A number of such arrays 665 of tabs are circumferentially distributed around the top end of the shaft section. A corresponding number of sets 668 of slots are provided on the bottom end of the angled shaft section 622. Similar arrays 665 of tabs are provided at the lower ends of other sections 626 and 628, and matching sets 668 of slots are provided at the upper ends of other sections 626 and 628. The shaft sections are provided in two alternating diameters, one diameter being slightly smaller than the other so that one section with a smaller diameter will fit snugly within an adjoining section having a larger diameter in a nesting configuration. Thus, adjoining shaft sections may fit into each other by alternating small and large diameter shaft sections. Each set 668 of slots is angularly aligned with one of the arrays 665 of tabs such that each slot of a top shaft section registers with one of the tabs of a bottom shaft section of two sections that are being interconnected.

Where the system output is located within the interior region of the building structure, the round-to-square transition piece 630 shown in in the drawings is attached to the lower straight shaft section 628. A hinging troffer bracket 632 is attached to the round-to-square transition piece and a ceiling diffuser (not shown) is secured to the troffer bracket 632 so that by swinging down troffer bracket 632 the ceiling diffuser is made accessible for ease of cleaning.

The drawings (FIGS. 6A and 6B) show an arrangement in which the optical modulator 609 mounted adjacent to the interior output of the tubular prismatic skylight, for example, adjacent to the ceiling diffuser secured to the troffer bracket 632. Similar to the earlier examples, however, an optical modulator may be mounted at other locations in or around the passive optical lighting device, in this case, at various points on, around or within the tubular prismatic skylight. FIG. 6B therefore shows several alternative examples of optical modulators 609 mounted within different tubular shafts of the tubular prismatic skylight. Although not shown, the optical modulator may be implemented on or in association with the skylight lens 612 or the diffuser 614; and still other locations in or around the elements of the skylight may be suitable, e.g. for particular types of optical modulators and/or for efficacious appearance or operation. As further examples, the optical modulator may be incorporated into the reflective surfaces of the tube of the skylight. In such an implementation, modulation of the light would occur through changes in the effective reflectivity of the tube walls. If the reflective walls work using Total Internal Reflection (TIR), it may be practical to modulate reflectivity by moving a scattering or absorbing material in and out of optical contact with the TIR surface(s). If the material is a specular reflector, e.g. metallic or multi-layer film, then modulation may occur through a thin film modulator on the inside surface. The modulator could use a change in scattering or an electrochromic change (e.g. car rearview mirrors) as examples.

The size of the optical modulator 609, e.g. in proportion to the size of skylight components, is chosen to make illustration of the modulators easy to see in the drawings and is not representative of actual size or proportions of the modulators, the skylight or any elements thereof. For example, each modulator may be implemented as a thin film on a transparent substrate and therefore difficult to distinguish as a separate component in view like those shown in FIGS. 6A and 6B.

Figure 7A:
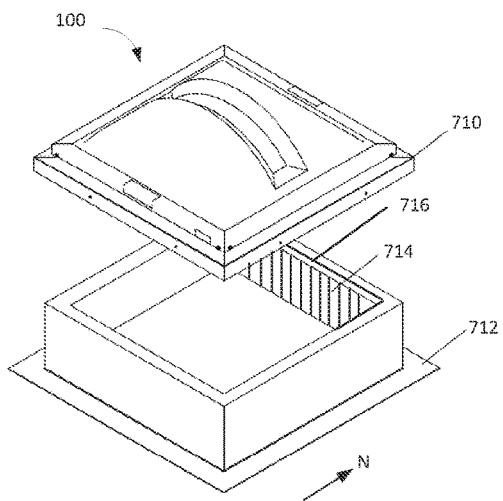
FIGS. 7A and 7B are perspective drawings other skylight systems.
Figure 7B:
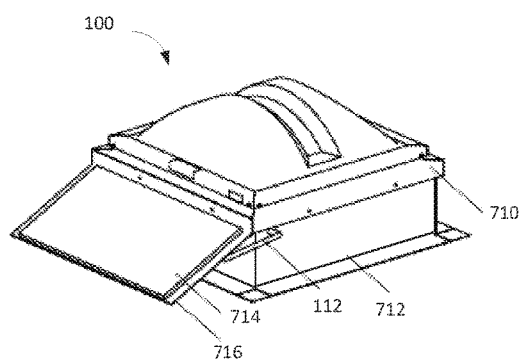

FIGS. 7A and 7B show further examples of the structure of a PV powered daylighting device 100. FIG. 7A shows a skylight 710, including a lens and a frame, and curb 712 that includes a PV device 714 mounted to a PV device mounting surface 716 of the curb. The curb 712 is incorporated in the roof surface and may be the curb piece 617 described above. In this example, the PV device is under the lens of the skylight 710 and, thus, protected from the elements. In the northern hemisphere, the PV powered daylighting device 100 shown in FIG. 7A is desirably mounted so that the PV device 714 is on the north side of the device. This orientation provides the greatest average illumination for the PV device 714. For the same reason, in the southern hemisphere, it would be desirable for the device 100 to be mounted so that the PV device 714 is on the southern side of the device.

FIG. 7B shows a PV powered daylighting device 100 in which the PV device 714 is mounted on the outside of a skylight 710. In this implementation, the skylight 710 is mounted on the curb 712 and the PV device is mounted on a mounting bracket 716. Electrical conduit 718 encloses the wiring that conveys the electrical power generated by the PV device 716 to the circuitry internal to the skylight, as described above with reference to FIGS. 1A through 1C. In the northern hemisphere, the PV device is desirably mounted on the south side of the device 100 and angled so that, on average, it is illuminated through the year. This angle may be, for example, midway between the angle of the sun at the winter solstice and the angle of the sun at the summer solstice. Alternatively, because the intensity of the sunlight is weakest at the winter solstice and strongest at the summer solstice, this angle may be set to achieve the greatest illumination during the winter solstice. As another alternative, the device 100 may include an actuator (e.g. a stepper motor) (not shown) powered by the PV device 104 to tilt the PV device 716 by an amount determined by the calendar or based on the sensed light intensity.

Aspects of methods of sending information using VLC through a PV powered daylighting device 100 and/or a luminaire 211v and/or receiving and acting on data sent through PV powered daylighting device 100 and/or a luminaire 211v outlined above may be embodied in programming, e.g. in the form of software, firmware, or microcode executable by a portable handheld device, a user computer system, a server computer or other programmable device. Program aspects of the technology may be thought of as "products" or "articles of manufacture" typically in the form of executable code and/or associated data that is carried on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into platform such as one of the controllers of FIGS. 2B, 3A, 3B and 4A-4D, a portable handheld device 225. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to one or more of "non-transitory," "tangible" or "storage" media, terms such as computer or machine "readable medium" refer to any medium that participates in providing instructions to a processor for execution.

Hence, a machine readable medium may take many forms, including but not limited to, a tangible or non-transitory storage medium, a carrier wave medium or physical transmission medium. Non-volatile storage media include, for example, optical or magnetic disks, such as any of the storage hardware in any computer(s), portable user devices or the like, such as may be used to implement the server computer 228, the personal computer 227, the mobile device 225 or controllers 218, 211, etc. shown in the drawings. Volatile storage media include dynamic memory, such as main memory of such a computer or other hardware platform. Tangible transmission media include coaxial cables; copper wire and fiber optics, including the wires that comprise a bus within a computer system. Carrier-wave transmission media can take the form of electric or electro-magnetic signals, or acoustic or light waves such as those generated during radio frequency (RF) and light-based data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying data and/or one or more sequences of one or more instructions to a processor for execution.

Program instructions may comprise a software or firmware implementation encoded in any desired language. Programming instructions, when embodied in a machine readable medium accessible to a processor of a computer system or device, render computer system or device into a special-purpose machine that is customized to perform the operations specified in the program.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "a" or "an" does not, without further constraints, preclude the existence of additional identical elements in the process, method, article, or apparatus that comprises the element.

Unless otherwise stated, any and all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

While the foregoing has described, what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

What is claimed is:

1. A system, comprising:
   a daylighting device configured to be mounted between exterior and interior regions of a structure and to pass daylight from the exterior region of the structure to illuminate a service area in the interior region;
   a sensor located to sense light levels at or near the daylighting device;
   a photo-voltaic (PV) device, coupled to the daylighting device;
   a daylighting transceiver and a daylighting controller coupled to receive operational power from the PV device,
   the daylighting transceiver including a daylighting transmitter comprising an optical modulator and a daylighting wireless receiver configured to receive wireless daylighting control signals, and
   the daylighting controller is configured to receive values representing the light levels;
   at least one luminaire arranged to illuminate the service area; and
   a lighting controller coupled to the at least one luminaire, the lighting controller having a wireless transceiver configured to:
   receive the values representing sensed light levels at or near the daylighting device from the optical modulator; and
   transmit the wireless daylighting control signals to the daylighting wireless receiver,
   wherein the lighting controller is configured to control output from the at least one luminaire to supplement daylight from the daylighting device in response to the values representing sensed light levels, and
   wherein the daylighting controller is further configured to control the optical modulator to attenuate the daylight passed from the exterior region to the interior region of the structure in response to the wireless daylighting control signals received from the lighting controller.

2. The system of claim 1, wherein the daylighting device is selected from a group consisting of: a skylight, a window and a tubular prismatic skylight.

3. The system of claim 1, wherein the PV device includes an array of cells selected from a group consisting of: monocrystalline silicon, polycrystalline silicon, amorphous silicon, perovskite, cadmium telluride, and copper indium gallium selenide/sulfide photo-electric devices.

4. The system of claim 1, wherein the PV device is configured to be mounted on the exterior region of the structure proximate to the daylighting device.

5. The system of claim 1, wherein the daylighting device includes a lens and the PV device is integral with the daylighting device and mounted to receive daylight passed through the lens of the daylighting device.

6. The system of claim 1, wherein:
   the daylighting controller and the optical modulator are configured to receive operational power from the PV device; and the optical signal transmitted from the optical modulator is a visible light communication (VLC) signal.

7. The system of claim 1, wherein the optical modulator includes at least one of a switchable glass element, a switchable thin-film element and a mechanical shutter.

8. The system of claim 1,
wherein the sensor receives light levels that are substantially the same as the light levels received by the daylighting device,
wherein the sensor is coupled to the daylighting transceiver to provide the sensed light level values to the daylighting transceiver; and
wherein the sensor is configured to receive operational power from the PV device.

9. The system of claim 1, further comprising:
circuitry, coupled to the PV device, the sensor and the daylighting transceiver, the circuitry generating the sensed light level values responsive to power signals provided by the PV device and output signals from the sensor.

10. The system of claim 1, further comprising:
an analog-to-digital converter (ADC) coupled to the light sensor and to the daylighting transceiver to generate digital values representing the sensed light levels;
a low-pass filter coupled between the ADC and the daylighting transceiver to filter the digital values representing the sensed light levels to provide filtered light level values to the daylighting transceiver as the values representing the sensed light levels; and
wherein the sensor, the ADC and the low-pass filter are configured to receive operational power from the PV device; and
wherein the daylighting transceiver is configured to generate and transmit digital packets including the digital values representing the sensed light levels.

11. The system of claim 1, further comprising:
a charging circuit coupled to receive the power signal from the PV device and configured to generate a substantially constant output voltage signal from the power signal; and
an energy storage device coupled to store energy provided by the PV device and to provide the operational power.

12. A system, comprising:
a daylighting device configured to be mounted between exterior and interior regions of a structure and to pass daylight from the exterior region of the structure to illuminate a service area in the interior region;
a sensor located to sense light levels at or near the daylighting device;
a photo-voltaic (PV) device, coupled to the daylighting device;
a daylighting transceiver and a daylighting controller coupled to receive operational power from the PV device;
the daylighting transceiver including a daylighting transmitter comprising an optical modulator and a daylighting wireless receiver configured to receive wireless daylighting control signals, and
the daylighting controller is configured to receive values representing the light levels from the sensor;
a user interface (UI) device;
at least one luminaire arranged to illuminate the service area; and
a lighting controller coupled to the at least one luminaire, the lighting controller including:
a processor including instructions that cause the processor to:
receive signals representing a desired light level from the UI device;
process the values representing the light levels at or near the daylighting device from the sensor and the optical modulator, and the signals representing the desired light level from the user interface to generate a luminaire control signal for the at least one luminaire; and
a wireless transceiver configured to:
receive the luminaire control signal; and
transmit the wireless daylighting control signals to the daylighting wireless receiver, wherein
the lighting controller is configured to control output from the at least one luminaire in accordance with the luminaire control signal to supplement daylight from the daylighting device so that the light level in the service area approaches the desired light level, and
the daylighting controller is further configured to control the optical modulator to attenuate the daylight passed from the exterior region to the interior region of the structure in response to the wireless daylighting control signals received from the lighting controller.

13. The system of claim 12, wherein the optical modulator, the daylighting controller and the daylighting receiver are coupled to the PV device to receive operational power.

14. A method comprising:
sensing a light intensity level proximate to a daylighting device configured to pass daylight from an exterior to an interior region of a building structure;
receiving, by a transceiver and a daylighting controller coupled to the daylighting device, an operational power signal from a photovoltaic (PV) device coupled to the daylighting device, the daylighting transceiver including a daylighting transmitter comprising an optical modulator and a daylighting wireless receiver receiving wireless daylighting control signals;
transmitting, by the transmitter, the sensed light intensity level and an identification value identifying the daylighting device to the daylighting controller;
controlling the optical modulator responsive to the wireless daylighting control signal to attenuate the daylight passed from the exterior to the interior region of the building structure; and
further controlling output from at least one luminaire arranged to illuminate a service area in the interior region to supplement the daylight from the daylighting device in response to the sensed light intensity levels.

15. The method of claim 14, wherein the sensing includes processing the operational power signal from the PV device to generate an indication of the sensed light intensity level.

16. The method of claim 14, wherein the sensing includes receiving the light intensity level from a photodetector mounted proximate to the daylighting device.

17. The method of claim 14, further comprising:
receiving by a lighting controller, the sensed light intensity level transmitted by the transmitter;
receiving a desired light level;
comparing the desired light level to the sensed light level value; and
when the desired light level is less than the sensed light level value, transmitting the control signal to the wireless receiver coupled to the daylighting device to control the optical modulator to attenuate the daylight passed from the exterior to the interior region of the building structure.

18. The method of claim 14, further comprising:
receiving by a lighting controller, the sensed light intensity level transmitted by the transmitter;
receiving a desired light level;
comparing the desired light level to the sensed light level value; and
when the desired light level is greater than the sensed light level value, controlling the at least one luminaire in the interior region of the structure to adjust a level of artificial light provided by the luminaire to illuminate the interior region of the structure to increase the level of artificial light provided by the luminaire.

* * * * *